United States Patent
Jitsuno et al.

(12)

(10) Patent No.: US 6,255,619 B1
(45) Date of Patent: Jul. 3, 2001

(54) LENS, SEMICONDUCTOR LASER ELEMENT, DEVICE FOR MACHINING THE LENS AND ELEMENT, PROCESS FOR PRODUCING SEMICONDUCTOR LASER ELEMENT, OPTICAL ELEMENT, AND DEVICE AND METHOD FOR MACHINING OPTICAL ELEMENT

(75) Inventors: Takahisa Jitsuno; Keiu Tokumara, both of Osaka; Hisashi Tamamura, Tokyo, all of (JP)

(73) Assignees: Nippon Aspherical Lens Co.,, Osaka; Sony/Tektronix Corporation, Tokyo, both of (JP)

( * ) Notice: Subject to any disclaimer, the term of this patent is extended or adjusted under 35 U.S.C. 154(b) by 0 days.

(21) Appl. No.: 09/142,400

(22) PCT Filed: Mar. 10, 1997

(86) PCT No.: PCT/JP97/00743

§ 371 Date: Mar. 8, 1999

§ 102(e) Date: Mar. 8, 1999

(87) PCT Pub. No.: WO97/33352

PCT Pub. Date: Sep. 12, 1997

(30) Foreign Application Priority Data

Mar. 8, 1996 (JP) .................................................... 8-080947
Mar. 8, 1996 (JP) .................................................... 8-080948

(51) Int. Cl.[7] ............................ B23K 26/04; B23K 26/02

(52) U.S. Cl. ................................ 219/121.62; 219/121.68; 219/121.73; 219/121.83

(58) Field of Search ......................... 219/121.62, 121.68, 219/121.69, 121.75, 121.73, 121.74, 121.81, 121.64, 121.83; 359/197

(56) References Cited

U.S. PATENT DOCUMENTS

| | | | |
|---|---|---|---|
| 4,734,558 | * | 3/1988 | Nakano et al. . |
| 5,243,195 | * | 9/1993 | Nishi . |
| 5,258,791 | * | 11/1993 | Penney et al. . |
| 5,541,731 | * | 7/1996 | Freedenberg et al. . |
| 5,585,019 | * | 12/1996 | Gu et al. . |
| 5,760,366 | * | 6/1998 | Haruta et al. . |
| 5,811,754 | * | 9/1998 | Nakatani . |
| 6,002,706 | * | 12/1999 | Staver et al. . |
| 6,034,349 | * | 3/2000 | Ota . |

* cited by examiner

Primary Examiner—Tom Dunn
Assistant Examiner—Jonathan Johnson
(74) Attorney, Agent, or Firm—Smith-Hill and Bedell

(57) ABSTRACT

This invention relates to a lens machining device for machining a lens so that the optical characteristics of light outputted by a semiconductor laser element (10) will be adjusted to desired ones. The lens (12) to be machined is provided at one end of the element (10) and the optical characteristics of the lens (12) are measured with a wave front measuring instrument (16) through the use of the light transmitted through the lens (12). A machining laser beam is focused upon the surface of the lens (12) through a beam splitter (14). The surface of the lens (12) is machined with the laser beam while a position adjusting device (22) adjusts the relative positional relation between the surface of the lens (12) and a position where the laser beam is focused. An ultraviolet laser (18) and the position adjusting device (22) are controlled by a controlling arithmetic device (24). The controlling arithmetic device (24) calculates machining data that bring the optical characteristics of the light transmitted through the lens (12) closer to the desired ones by using the measurement data from the wave front measuring instrument (16). When the lens is machined in such a way, the light transmitted through the lens (12) may have such optical characteristics that the shape of the light beam is a true circle.

53 Claims, 4 Drawing Sheets

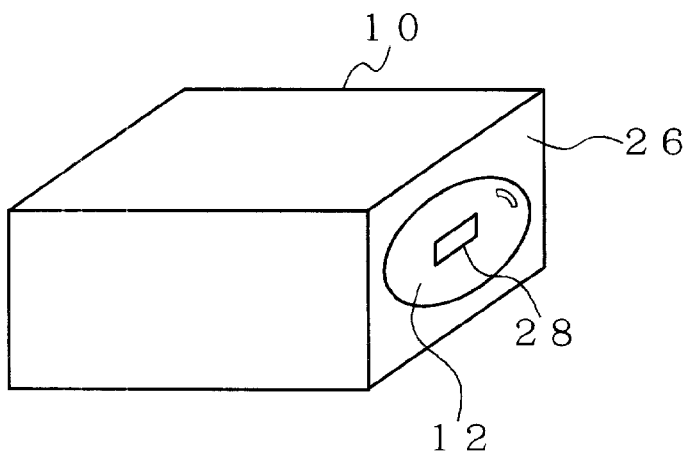
FIG. 3A
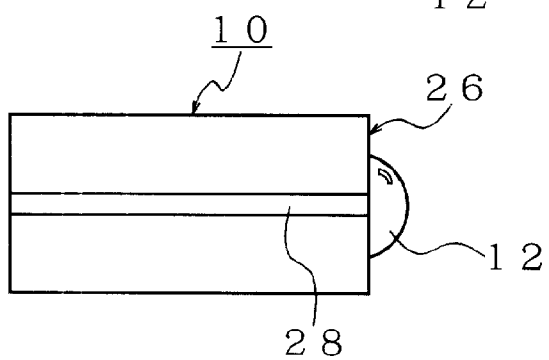
FIG. 3B
FIG. 4
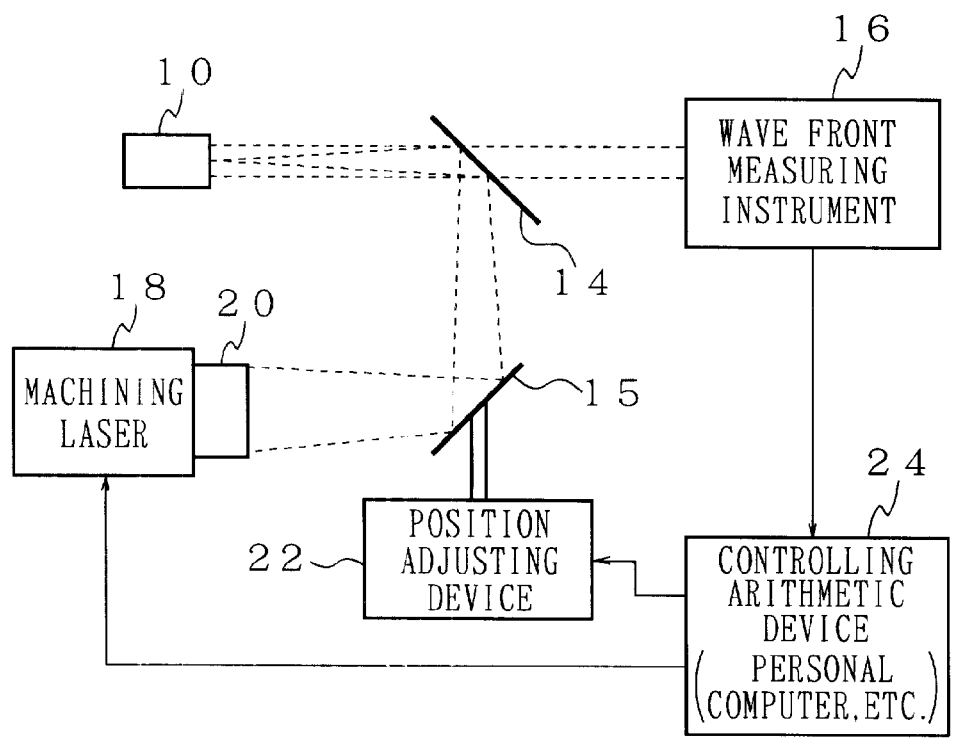

LENS, SEMICONDUCTOR LASER ELEMENT, DEVICE FOR MACHINING THE LENS AND ELEMENT, PROCESS FOR PRODUCING SEMICONDUCTOR LASER ELEMENT, OPTICAL ELEMENT, AND DEVICE AND METHOD FOR MACHINING OPTICAL ELEMENT

TECHNICAL FIELD

The present invention relates to a lens, a semiconductor laser element, a device for machining the lens and element, a process for producing the semiconductor laser element, an optical element, and a device and a method for machining the optical element. More particularly, the invention relates to an optical element such as a lens whose light-emitting surface is so machined as to provide desired optical characteristics, a semiconductor laser element which is mounted with the optical element, a semiconductor laser element which has its light-emitting surface machined to provide desired optical characteristics, and a device and a method for machining the optical element precisely to let the optical element such as a lens or a semiconductor laser element offer desired optical characteristics.

BACKGROUND ART

The semiconductor laser element is used as a small, inexpensive laser source such as one for the optical pickup to read data optically from optical disks. As shown in FIG. 8, a laser beam is outputted illustratively from an area 28 about 2 μm wide on an end surface 26 of a semiconductor laser element 10 having an active layer about 0.1 μm thick. As indicated, the light-emitting area 28 is shaped substantially as a rectangle, one pair of sides of which is longer than the other. Since light is diffracted more at the shorter sides than at the longer sides of the rectangle, the output laser beam has a cross section which is not a true circle but an ellipse elongated in the direction of the shorter sides. To use such an output laser beam as the light source of an optical pickup requires adjusting the laser beam so that the beam will have a true circle in shape and will have parallelism. The requirement is met generally by means of lens-based optics.

Lenses are made from plastics or glass. Glass lenses are preferred because plastic lenses, though easy to machine, are prone to degrade in characteristics due to expansion or contraction provoked by the heat of the beam.

Today, optics design is carried by computers running optical system (optimizing) design programs. The procedure makes it relatively easy to obtain optical systems with desired characteristics. However, optimally designing an optical system does not necessarily make the actual production of the designed system implementable because of technical or cost constraints.

A plurality of spherical lenses are usually employed to build an optical system for making the output beam of a semiconductor laser element into one which is a true circle in shape and has parallelism. The multiple lenses tend to constitute a bulky optical system. To implement an optical system of the same characteristics with fewer lenses requires the use of an aspherical lens arrangement. Manufacturing an aspherical lens from glass is an expensive process involving sophisticated machining techniques. In particular, it is very difficult to accomplish the precise machining of free curves on lenses whose diameters are less than one mm.

Semiconductor laser elements are known to have variations in characteristics therebetween. Thus if the optical system is designed, using numerous semiconductor laser elements, to obtain desired optical characteristics, said characteristic variations between the elements can lead to a lower yield of the products.

Under the circumstances, a need has been recognized for easy manufacturing of a small optical element (lens) that adjusts an output laser beam of a semiconductor laser element as desired one, e.g., into a beam which is a true circle in shape and has parallelism.

The optical system may also be reduced in size by outright elimination of a small optical element to make way for a novel optical setup such as a semiconductor laser element mounted with a lens having desired optical characteristics. There is clearly a need for such a lens-mounted semiconductor laser element. Also desired earnestly are a device and a method for machining such an optical element with relative ease.

Meanwhile, high-power semiconductor laser elements among the semiconductor laser elements serve as small, highly efficient laser sources. They are utilized as excitation sources of laser-based machine tools and other laser media.

Attempts to gain a laser beam of higher power can destroy the laser element if its active layer (i.e., stripe width) is not sufficiently thick. Thus, common practice to minimize optical damage to the element involves widening its stripe width illustratively to about 100 μm. The trouble is that greater stripe widths are liable to invoke a multiple-peak mode corrupting the single-peak characteristic of the laser beam. In other words, the output area 28 of the end surface 26 can be seen apparently to output a plurality of laser beams.

As described, high-power semiconductor laser elements with extended stripe widths of their active layers are thus prone to multiple peaks in the output laser beam; laser beam coherence is not available. However, a high-power semiconductor laser element will offer a single-peak mode if its resonant mirror-finished surface (light-emitting end surface) is a concave instead of plane. Such a high-power semiconductor laser element will drastically enhance the efficiency of laser beam utilization.

To obtain desired optical characteristics, it is necessary to carry out a process of precisely machining, on the order of microns, the end surface of the element acting as the resonant mirror-finished surface of the high-power semiconductor laser element. That process is delicate and is difficult to implement.

As mentioned, semiconductor laser elements tend to have variations in characteristics therebetween. Given such a tendency, measures need to be taken to improve the yield percentage in producing numerous semiconductor laser elements having the same desired optical characteristics.

First to be desired is a semiconductor laser element that generates a single-peak output laser beam. Also desired is a semiconductor laser element whose optical characteristics may be adjusted to make the output laser beam into one which is a true circle in shape and has parallelism. Naturally, it is desired to have a device and a method for easily machining laser elements with a high precision so that they will possess the above necessary optical characteristics.

It is therefore an object of the present invention to provide a lens machined to offer the desired optical characteristics, a semiconductor laser element which is mounted with such a lens, a semiconductor laser element which has its light-emitting surface machined to provide the desired optical characteristics, and a device and a method for precisely machining the lens and element to produce the desired optical characteristics.

DISCLOSURE OF INVENTION

In carrying out the invention and according to one aspect thereof, there is provided a device for machining an optical element such as a lens, specifically its target surface, with a high precision so that the optical element will adjust optical characteristics of light from light output means such as a semiconductor laser element to the desired ones. The lens may be made preferably from glass or crystal.

The target lens to be machined to provide the desired optical characteristics is located at one end of the light output means for emitting light. The light from the light output means passes through the lens and the optical characteristics of the light are measured by optical measuring means. Machining laser beam output means is provided to focus a machining laser beam on the lens surface through a beam splitter or the like. The machining laser beam output means may illustratively be an ultraviolet laser element such as an excimer laser device.

Position adjusting means is provided to adjust in a relative manner the optical positional relation between the lens surface and the position where the machining laser beam is focused. The machining laser beam output means and the position adjusting means are controlled by controlling arithmetic means. Using data from the optical measuring means, the controlling arithmetic means causes the machining laser beam output means with its laser beam to machine the lens so that the light passing through the lens will have optical characteristics approximating the desired properties.

If the light output means is a semiconductor laser element, a lens may be formed on that end surface of the element which outputs a laser beam. That lens may be machined in such a way.

Further, the controlling arithmetic means may be arranged to prevent utilizing measurement data from the optical measuring means when the end surface is thermally affected by absorption of the machining laser beam. This makes it possible to avoid adverse effects of a lens temporarily expanded by the heat caused by the beam absorption, whereby good machining accuracy is obtained.

According to another aspect of the invention, there is provided a process for producing a semiconductor laser element whose laser beam-emitting surface is machined so as to offer desired optical characteristics. In this case, the semiconductor laser element itself is the optical element to be machined and one of its end surfaces is the surface to be machined. The device used to machine the semiconductor laser element is similar to the lens machining device described above.

Optical measuring means constituting part of the machining device generates measurement data about optical characteristics of the laser beam outputted by the semiconductor laser element. The optical measuring means may be used illustratively as an interferometer to measure optically the shape of the beam-emitting surface of semiconductor laser element. Machining laser beam output means is provided to output a machining laser beam that is focused by known optics on the end surface of the semiconductor laser element.

Position adjusting means is provided to adjust in a relative manner the optical positional relation between the end surface of the semiconductor laser element and the position where the machining laser beam is focused. The machining laser beam output means and the position adjusting means are controlled by the controlling arithmetic means. Using measurement data from the optical measuring means, the controlling arithmetic means causes the machining laser beam output means with its laser beam to machine the end surface of the element so that the light outputted by the end surface will have optical characteristics approximating the desired properties.

Where the end surface of the semiconductor laser element is machined by the machining laser beam to offer the desired optical characteristics, the single-peak property of the laser beam from the element is improved. The single-peak improvement is realized specifically by machining into a curved surface at least one of the paired resonant mirror-finished surfaces, opposed to each other, of the semiconductor laser element wherein a laser beam resonates.

Absorption of the machining laser beam, leads to thermally induced expansion the end surface of the semiconductor laser element. Because the thermally induced expansion is temporary and should not occur during normal use, measurement data representing optical characteristics of the laser beam outputted by the semiconductor laser element in this transient state cannot be utilized. For that reason, until the adverse effects of the heat dissipate, the controlling arithmetic means prevents the use of any measurement data from the optical measuring means. The momentary exclusion of inaccurate measurement data ensures machining of high precision.

The machining laser beam may be other than a beam of the ultraviolet range. In some cases, a laser beam of the green range may be used or a combination of beams of different frequency bands may be employed effectively. In any case, the laser beam should be one which can be absorbed efficiently by the end surface 26 of the semiconductor laser element 10.

BRIEF DESCRIPTION OF DRAWINGS

FIGS. 3A and 3B are schematic views showing a lens-mounted semiconductor laser element according to the invention;

FIG. 4 is a block diagram showing a preferred example of a semiconductor laser element machining device embodying the invention;

BEST MODE FOR CARRYING OUT THE INVENTION

The best mode for carrying out the invention will now be described in detail with reference to the accompanying drawings.

Figure 1:
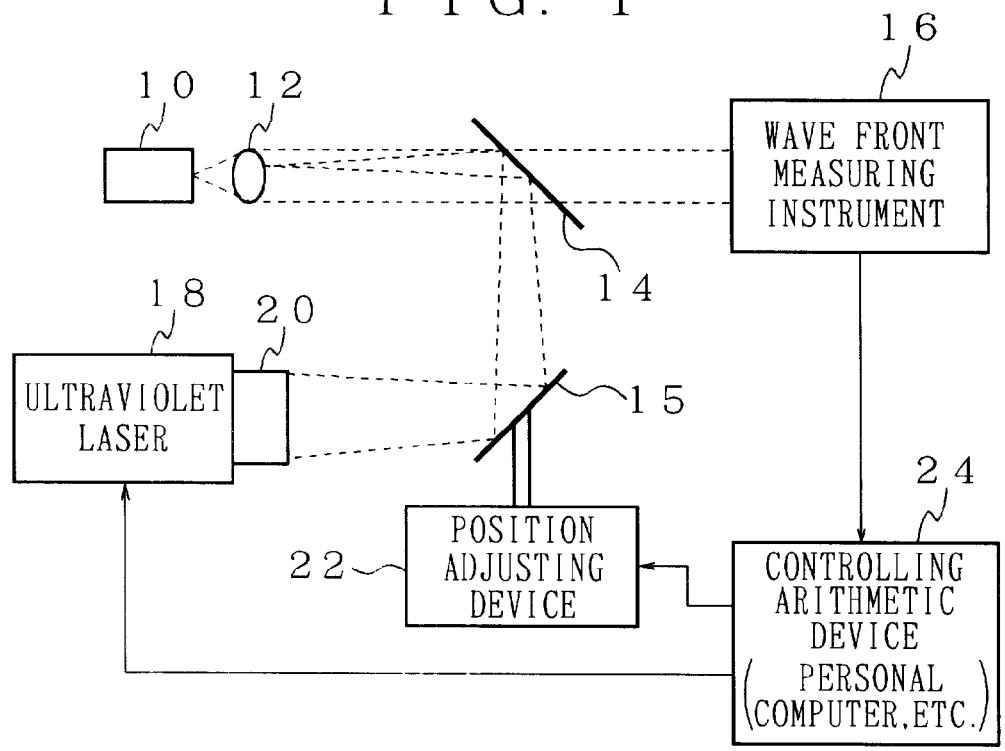
FIG. 1 is a block diagram showing a preferred example of a lens machining device embodying the invention.

FIG. 1 is a block diagram showing a preferred example of a lens machining device embodying the invention. This embodiment may be applied to a lens or a semiconductor laser element with a lens mounted thereon.

The lens machining device is used to machine a target lens 12 (optical element) so that a laser beam passing through the lens 12 from a semiconductor laser element 10 (light output means) will have desired optical characteristics such as being truly circular in shape and having parallelism. The target lens 12 has already been roughly machined so that the laser beam from the semiconductor laser element 10 may have a true circle in shape and have parallelism. The lens 12 should preferably be made from glass.

The materials from which the lens 12 is made may illustratively be optical materials such as glass, preferably optical glass that is uniform in quality with very small refractive distortion. The term "glass" refers to an amorphous state of the material cooled appropriately and solidified without crystallization from a melted liquid state thereof. Transparent in its visible light range, glass may become opaque at some frequency bands in the ultraviolet or infrared range. Depending on the characteristics of the light to be used, it may be preferable in some cases to use as the materials of lens the crystals such as sapphire, silicon and germanium. Illustratively, sapphire crystal lenses may be used for an infrared range with a wavelength of about three microns, and zinc selenide crystal lenses may be employed for an infrared range with a wavelength of about 10 microns. Glass may sometimes be burned and destroyed by heat from light emission, whereas some crystals (e.g., silicon) are resistant to such optical damage. With these properties taken into consideration, any one of the cited materials maybe used to adapt to the purpose in question.

The laser beam past the target lens 12 to be machined enters a wave front measuring instrument 16 (optical measuring means) by way of a beam splitter 14. The wave front measuring instrument 16 measures optical characteristics of the received laser beam and generates measurement data accordingly. The instrument 16 will be described later in more detail.

An ultraviolet laser element 18 (machining laser output means) has an optical system 20 through which an ultraviolet laser beam is outputted. The output laser beam is reflected by a mirror 15 and the beam splitter 14 before being focused on a desired spot of the surface of the target lens 12 to be machined. The laser source of the ultraviolet laser element 18 may illustratively utilize an excimer laser or a YAG-based quadruple wave emission. The excimer laser may be a rare gas halide excimer laser that combines rare gas with halogen gas. Given the fact that the shorter the wavelength, the smoother the etched surface, an ArF laser element with a wavelength of 193 nm is preferred.

An ultraviolet laser beam focused on the surface (one to be machined) of the target lens 12 cuts molecular bonds on the lens surface instantaneously through optical ablation. Working as it does, the ultraviolet laser beam is suited for micro-machining of the surface of the glass lens 12. The laser beam is outputted in pulses, inputting several Joules (J) of energy into the workpiece over a period of about 10 nanoseconds. Because the duration of the beam output is significantly shorter than the time required for thermal expansion, the workpiece is machined precisely without being damaged by heat. That is, it is much less likely for the vicinity around the machined spot to develop fragments resolidified after melting by heat. The energy of ultraviolet wavelengths enters the workpiece to a depth of less than one micrometer (on the submicron order). This makes it possible to machine an extremely thin layer of the lens surface.

The beam splitter 14 and mirror 15 deteriorate over time because they are subject to sustained ultraviolet laser beam emissions. However, the beam splitter 14 and the components nearby are positioned out of the beam focus and therefore may be used for an appreciably extended period of time.

A position adjusting device 22 moves the mirror 15 under control of a controlling arithmetic device 24, shifting the optical axis of the ultraviolet laser beam coming from the ultraviolet laser element 18. The manipulation of the mirror 15 adjusts in a relative manner an optical positional relation between the surface of the target lens 12 and the position where the ultraviolet laser beam is focused. The controlling arithmetic device 24 causes the position adjusting device 22 and the optical system 20 of the ultraviolet laser element 18 to focus the ultraviolet laser beam on the necessary spot of the surface of the target lens 12 to be machined for machining purposes.

The wave front measuring instrument 16 may illustratively be the 13WAS001 Wave Analyzer available from Mellesgriot Corp. of the United States. This instrument comprises an interferometer, a CCD camera and an electronic driving mechanism. The Wave Analyzer measures electric field distribution (beam intensity distribution) of the laser beam based on the operating principle of an interferometer. In so doing, the instrument measures not only the shape and diameter of the laser beam but also the aberration and phase of the wave front.

The controlling arithmetic device 24 may illustratively be a personal computer carrying a microprocessor from Intel Corp., of the United States. Measurement data (beam intensity distribution, wave front shape, etc.) from the wave front measuring instrument 16 are graphically displayed in a two- or three-dimensional manner on a display unit of the controlling arithmetic device 24. A storage equipment, such as a hard disk drive or like, of the controlling arithmetic device 24 accommodates various programs necessary for lens machining. The stored programs may include the optical system design program mentioned earlier. These programs are executed to control, as will be described later, the ultraviolet laser element 18 and the optical system 20 included therein as well as the position adjusting device 22.

As described above, the laser beam that is outputted directly by the semiconductor laser element 10 is elliptical in shape and without parallelism. If desired optical characteristics such as a true circle and parallelism are to be obtained from the laser beampast the lens 12, it is necessary to machine the lens 12 into an aspherical lens. The following is a description of how to machine the lens by the device depicted in FIG. 1 so that the laser beam will have the optical characteristics of a true circle and parallelism.

First, the semiconductor laser element 10 is activated to output a laser beam. With the laser beam transmitted through the lens 12 to be machined, optical characteristics of the laser beam are measured by the wave front measuring instrument 16 (first step).

Measurement data from the wave front measuring instrument 16 are processed by the controlling arithmetic device 24 applying the optical system design program. This provides data representing the current optical characteristics (i.e., affected by the lens shape) of the lens 12. The data are also compared with reference data obtained when a laser beam of the desired optical characteristics is received by the wave front measuring instrument 16. The reference data may be acquired either theoretically by mathematics or actually from the measurement data given by the wave front measuring instrument 16 accepting a laser beam having the necessary optical characteristics such as a true circle and parallelism. In the actual measuring process, an interference fringe (specifically the fringe shape) may be utilized as a parameter.

The controlling arithmetic device 24 produces machining data through computations allowing the measurement data from the wave front measuring instrument 16 to approximate the reference data, so that the laser beam past the target lens 12 may have the desired optical characteristics (second step) In accordance with the machining data thus obtained, the controlling arithmetic device 24 causes the ultraviolet laser element 18 (including its optical system 20) and the position adjusting device 22 to machine the target lens 12 into shape (third step).

By carrying out the first through the third steps above, the lens 12 having the desired optical characteristics is obtained.

While the target lens 12 is being machined by the ultraviolet laser beam, the semiconductor laser element 10 is allowed to oscillate continuously. This is because a significant difference in wavelength excludes the possibility of interference between the laser beam from the semiconductor laser element 10 and the ultraviolet laser beam.

During machining of the lens by the ultraviolet laser beam, it is not very likely for the proximity of the machined spot to develop segments resolidified after melting by the heat. Still, the ultraviolet laser beam is set to have an energy level slightly higher than that necessary for machining (i.e., cutting of molecular bonds) upon entry into the lens. The elevated energy level causes a part of heat to remain momentarily at the machined spot at the time of the beam entry. The residual heat expands the surface of the target lens 12, temporarily altering the optical characteristics of the lens. This requires that the effects of variations in optical characteristic caused temporarily by the residual heat due to the absorption of ultraviolet laser beam be prevented from being fed back to the lens machining process. The requirement is met illustratively as follows:

Every time a pulse of an ultraviolet laser beam is outputted, the controlling arithmetic device 24 discards measurement data coming from the wave front measuring instrument 16 for a predetermined period of time; When the effects of the residual heat at the time of the entry of the ultraviolet laser beam have disappeared in the lens, the controlling arithmetic device 24 again accepts the measurement data from the wave front measuring instrument 16 to control the ultraviolet laser beam; Such a process is repeated so that the machined lens will gradually approximate its theoretically ideal shape. In other words, the controlling arithmetic device 24 is kept from utilizing the measurement data obtained with the laser beam transmitted through the lens 12 while it is thermally expanded by the machining laser beam.

It is also preferred, if possible, to fabricate an optical system that is optimally fit for each specific semiconductor laser element. Such an arrangement will drastically enhance the yield rate of laser element production.

Figure 2:
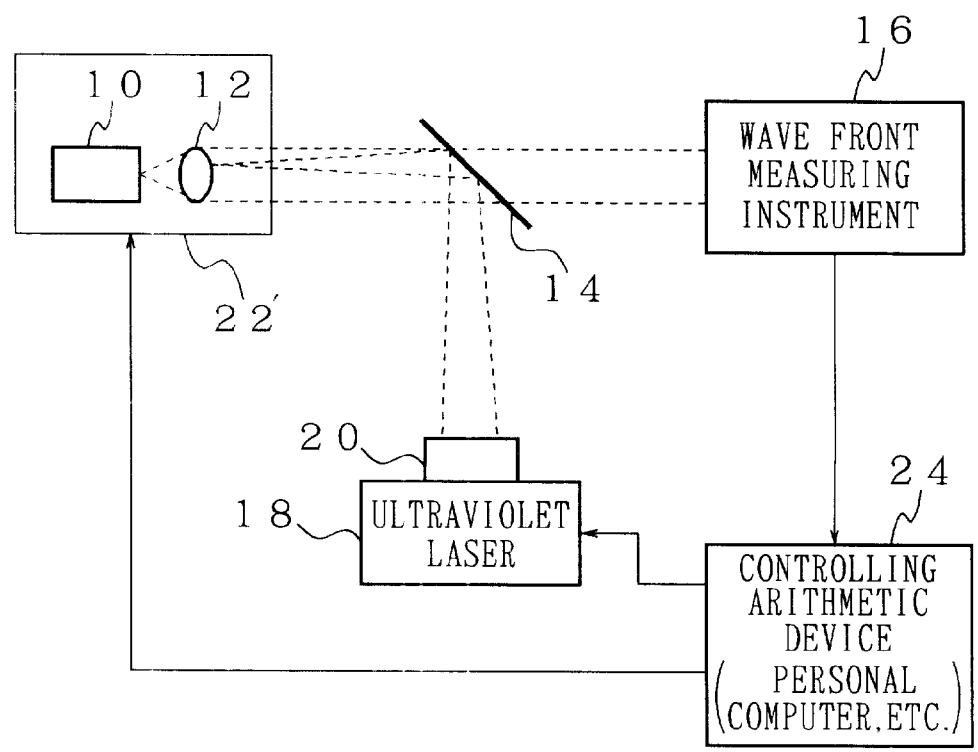
FIG. 2 is a block diagram showing another preferred example of a lens machining device embodying the invention.

FIG. 2 is a block diagram showing another example of the lens machining device embodying the invention. The setup of FIG. 1 was shown having the position adjusting device 22 manipulate the mirror 15 to shift the optical axis of the ultraviolet laser beam. Alternatively, as shown in FIG. 2, another position adjusting device 22' may be adopted to move the semiconductor laser element 10 and lens 12 relative to the other components. With the semiconductor laser element 10 and lens 12 shifted, the optical axis of the laser beam from the semiconductor laser element 10 entering the beam splitter 14 and the wave front measuring instrument 16 is dislodged. However, the diameter of the lens 12 is small enough and its measured surface is wide enough for the optical path of the laser beam to stay within the wave front measuring instrument 16 during the axis shifting operation.

The lens having the above-described optical characteristics may be attached to the semiconductor laser element itself. FIGS. 3A and 3B are schematic views showing a lens-mounted semiconductor laser element according to the invention.

FIG. 3A is a perspective view of the semiconductor laser element 10, and FIG. 3B is a side view of the same element. As illustrated, the lens 12 for compensating optical characteristics is mounted directly on the end surface 26 that outputs the laser beam of the semiconductor laser element 10.

Because the lens 12 (optical system) and the semiconductor laser element 10 are integrally combined, the setup is capable of making the entire laser beam emitter smaller than ever while maintaining the desired optical characteristics. The surface of the lens 12, already machined roughly, is to be finished precisely to become aspherical in the manner described above. Because the lens 12 is machined to match the peculiarities of the individual semiconductor laser element 10, the yield rate of semiconductor laser elements 10 equipped with the lens (optical system) is improved.

To fabricate the lens-mounted semiconductor laser element 10 involves carrying out the following steps: in brief, the light-emitting end surface 26 of the semiconductor laser element 10 is initially mounted with a lens (first step); The semiconductor laser element 10 is then activated to output light (second step); The optical characteristics of the light transmitted through the lens 12 from the semiconductor laser element 10 are measured (third step); On the basis of measurement data acquired in the third step, the controlling arithmetic device computes machining data allowing the target lens 12 to be machined so that the latter will provide the desired optical characteristics (fourth step); In accordance with the computations in the fourth step, a machining laser beam (ultraviolet laser beam) is emitted to machine the lens 12 (fifth step), whereby the lens-mounted semiconductor laser element 10 is formed.

Figure 5:
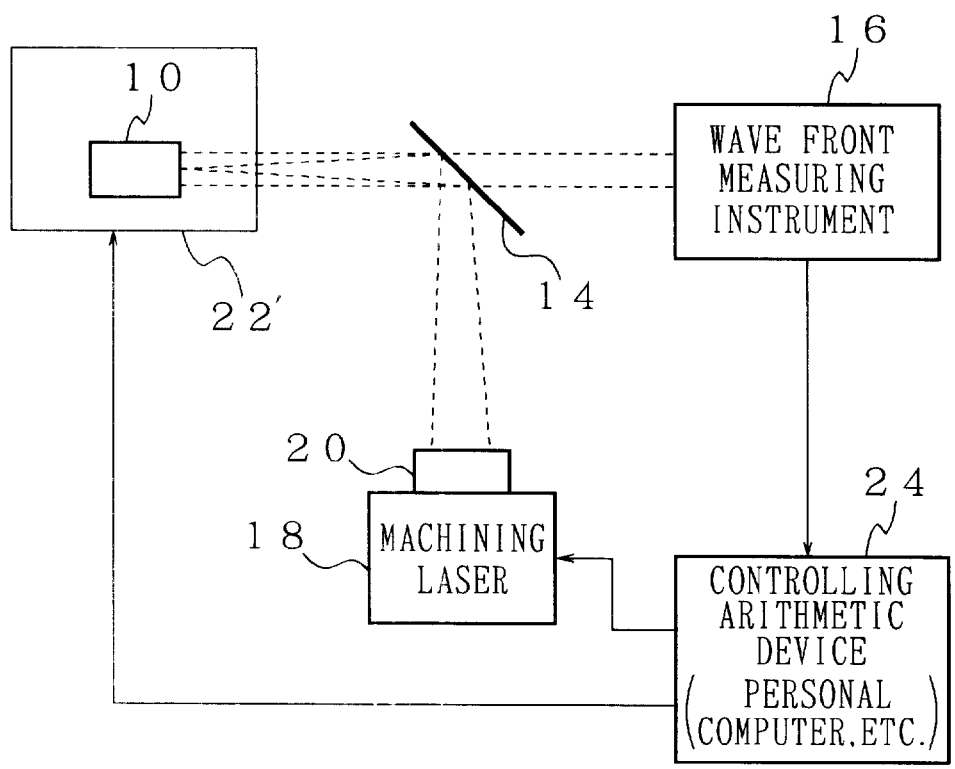
FIG. 5 is a block diagram showing another preferred example of the semiconductor laser element machining device embodying the invention.

The invention also permits fabricating a semiconductor laser element that by itself offers the desired optical characteristics. In that case, the semiconductor laser element itself is the optical element to be machined and one of its end surfaces is the surface to be machined. FIGS. 4 and 5 are block diagrams showing examples of semiconductor laser element machining devices embodying the invention, each device affording the desired optical characteristics to the light-emitting end surface of a semiconductor laser element.

Each of the machining devices in FIGS. 4 and 5 is basically the same as the device shown in FIG. 1, and the description that follows with reference to FIG. 4 will partially repeat what was discussed above. As shown in FIG. 4, a laser beam that is outputted from a light-emitting area 28 on the end surface (surface to be machined) 26 of the semiconductor laser element 10 reaches a wave front measuring instrument 16 (optical measuring means) through a beam splitter 14.

A machining laser element 18 has an optical system 20 through which is outputted a machining laser beam. Via a mirror 15 and through the beam splitter 14, the machining laser beam is focused on the desired spot of the end surface 26. The laser source of the machining laser element 18 may illustratively utilize an excimer laser or a YAG-based quadruple wave emission as mentioned above. Because the shorter the wavelength, the smoother the etched surface, an ArF laser element such as one with a wavelength of 193 nm is preferred.

The machining laser beam may be other than a beam of the ultraviolet range. In some cases, a laser beam of the green range may be used or a combination of beams of different frequency bands may be employed effectively. In any case, the laser beam should be one which can be absorbed efficiently by the end surface 26 of the semiconductor laser element 10.

Where an ultraviolet laser beam is used for machining, the beam focused on the target spot in the vicinity of the light-emitting area 28 of the end surface 26 cuts instantaneously molecular bonds on the end surface through optical ablation as in the case of FIG. 1. Thus the ultraviolet laser beam is suitable for micro-machining.

The ultraviolet laser beam is outputted in pulses, inputting several Joules (J) of energy into the workpiece over a period of about 10 nanoseconds. Because the duration of the beam output is significantly shorter than the time required for thermal expansion, the workpiece is machined precisely without being damaged by heat. That is, it is much less likely for the vicinity around the machined spot to develop fragments resolidified after melting by heat. The energy of ultraviolet wavelengths enters the workpiece to a depth of less than one micrometer (on the submicron order). This makes it possible to machine an extremely thin layer of the lens surface.

The beam splitter 14 in the above setup deteriorates over time because it is subject to sustained ultraviolet laser beam emissions. However, the beam splitter 14 is positioned out of the beam focus and therefore may be used for an appreciably extended period of time.

A position adjusting device 22 moves the mirror 15 under control of a controlling arithmetic device 24, shifting the optical axis of the machining laser beam coming from the machining laser element 18. The manipulation of the mirror 15 adjusts in a relative manner the optical positional relation between the end surface 26 of the semiconductor laser element 10 and the position where the machining laser beam is focused. The controlling arithmetic device 24 causes the position adjusting device 22 and the optical system 20 of the machining laser element 18 to focus the machining laser beam on the target spot of the end surface 26 for machining purposes.

The wave front measuring instrument 16 may illustratively be the same Wave Analyzer used in the setup of FIG. 1. The controlling arithmetic device 24 may also be the same personal computer for the setup in FIG. 1. These specific devices were discussed earlier and will not be described further.

In order for the semiconductor laser element to output directly a laser beam with the desired optical characteristics such as a single-peak property, a true circle and parallelism, machining is to be carried out as follows:

The semiconductor laser element 10 is first activated to output a laser beam from its end surface 26. The laser beam is measured for optical characteristics by the wave front measuring instrument 16 (first step).

Measurement data from the wave front measuring instrument 16 are processed by the controlling arithmetic device 24 applying the optical system design program. This provides data representing optical characteristic data about the currently shaped end surface 26 of the semiconductor laser element 10. The data are compared with reference data obtained when a laser beam of the desired optical characteristics is received by the wave front measuring instrument 16. The reference data may be acquired either theoretically by mathematics or actually from the measurement data given by the wave front measuring instrument 16 accepting a laser beam having the necessary optical characteristics such as a single-peak property, a true circle and parallelism.

The controlling arithmetic device 24 produces machining data through computations allowing the measurement data from the wave front measuring instrument 16 to approximate the reference data, so that the laser beam may have the desired optical characteristics (second step). In accordance with the measurement data thus obtained, the controlling arithmetic device 24 causes the machining laser element 18 (including its optical system 20) and the position adjusting device 22 to machine the necessary spot of the end surface 26 of the semiconductor laser element 10 (third step).

While the end surface 26 is being machined by the machining laser beam, the semiconductor laser element 10 is allowed to oscillate continuously. This is because, as mentioned with regard to FIG. 1, a significant difference in wavelength excludes the possibility of interference between the laser beam from the semiconductor laser element 10 and the ultraviolet laser beam.

During machining of the end surface 26 by the laser beam in FIG. 4, as in the process of FIG. 1, it is not very likely for the proximity of the machined spot to develop segments resolidified after melting by heat. Still, the ultraviolet laser beam is set to have an energy level slightly higher than that necessary for machining (i.e., cutting of molecular bonds) upon entry into the end surface of the element.

The elevated energy level causes a part of heat to remain momentarily at the machined spot at the time of the beam entry. The residual heat partially expands the end surface 26. This requires that the effects of variations in optical characteristic caused temporarily by the residual heat due to the absorption of the ultraviolet laser beam be prevented from being fed back to the machining process. The requirement may be satisfied as follows:

Every time an ultraviolet laser beam is outputted, the controlling arithmetic device 24 in the setup of FIG. 4 discards measurement data coming from the wave front measuring instrument 16 for a predetermined period of time; When the effects of the residual heat at the time of the entry of the ultraviolet laser beam have disappeared in the machined spot, the controlling arithmetic device 24 again accepts the measurement data from the wave front measuring instrument 16 to control the ultraviolet laser beam; The process is repeated so that the machined end surface of the element will gradually approximate its theoretically ideal shape. In other words, the controlling arithmetic device 24 is kept from utilizing the measurement data obtained through measurement of the laser beam output from the end surface 26 thermally expanded by the machining laser beam.

It is not mandatory to place a beam splitter in the path of an ultraviolet laser beam directed at the end surface 26 of the semiconductor laser element. Alternatively, the laser beam may be emitted diagonally relative to the front of the end surface 26 of the semiconductor laser element.

The above-described machining device may be used to produce a semiconductor laser element with its light-emitting end surface machined so as to provide the desired optical characteristics. The machining process using that machining device is the same as the process discussed in connection with the device of FIG. 1 (first through third steps) and thus will not be described further.

FIG. 5 is a block diagram showing another preferred example of the semiconductor laser element machining device embodying the invention, the device machining a semiconductor laser element so that the laser beam will have desired optical characteristics.

In the setup of FIG. 4, the position adjusting device 22 was shown as one adjusting the mirror 15 to shift the optical axis of the ultraviolet laser beam. Alternatively, as shown in FIG. 5, a position adjusting device 22' may be arranged to move the semiconductor laser element 10 relative to the other components. Relocating the semiconductor laser element 10 entails disturbing the optical axis alignment of the laser beam from the semiconductor laser element 10 entering the beam splitter 14 and the wave front measuring instrument 16. However, the diameter of the laser beam is significantly smaller than the apparent size shown in FIGS. 1 and 2, so that the optical path of the laser beam stays well within the wave front measuring instrument 16 during the axis shifting operation.

Figure 6:
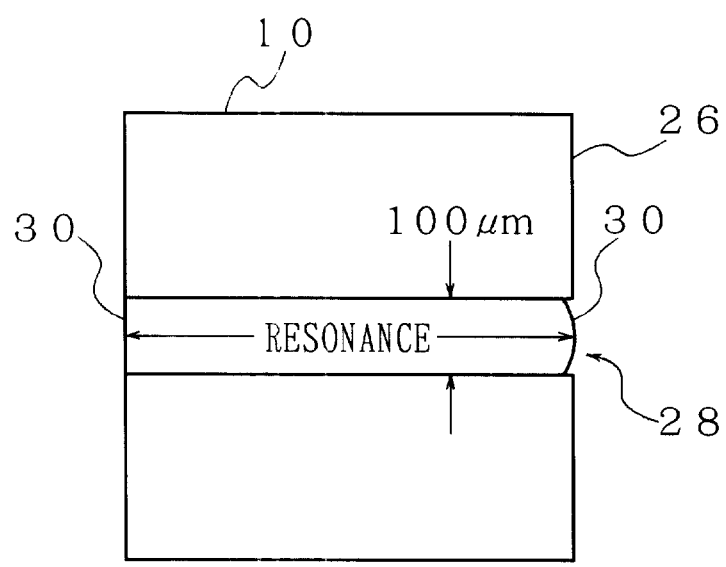
FIG. 6 is a top view conceptually depicting paired resonant mirror-finished surfaces of a semiconductor laser element, the surfaces being opposed to each other.

FIG. 6 is a top cross-sectional view depicting part of an active layer of the semiconductor laser element 10. An ultraviolet laser beam is used to machine specifically the vicinity of a light-emitting area 28 on the end surface 26, forming a curved surface (e.g., concave or convex) out of a resonant mirror-finished surface 30. In the example of FIG. 6, one of the paired resonant mirror-finished surfaces is machined into a curved surface. Alternatively, the two mirror-finished surfaces may be machined into curved surfaces. Machining at least one of the paired resonant mirror-finished surfaces which are opposed to each other, into a curved surface (e.g., concave) makes it possible to reduce the incidence of multiple-peak status in the laser beam even when its stripe is appreciably wide.

Although FIG. 6 shows that one resonant mirror-finished surface 30 is machined only horizontally, the machining process takes place in the vertical direction as well. In each direction, an appropriate radius R (of curvature) is formed.

Figure 7:
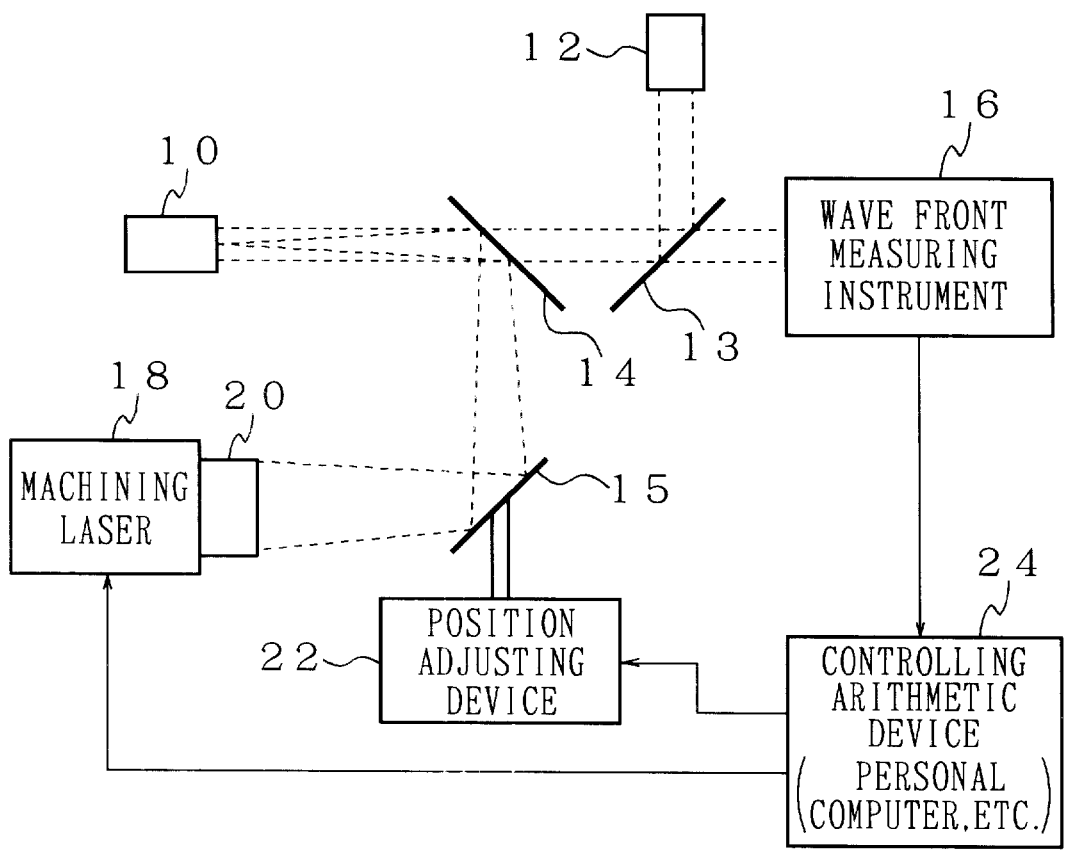
FIG. 7 is a block diagram showing still another preferred example of the semiconductor laser element machining device embodying the invention.
Figure 8:
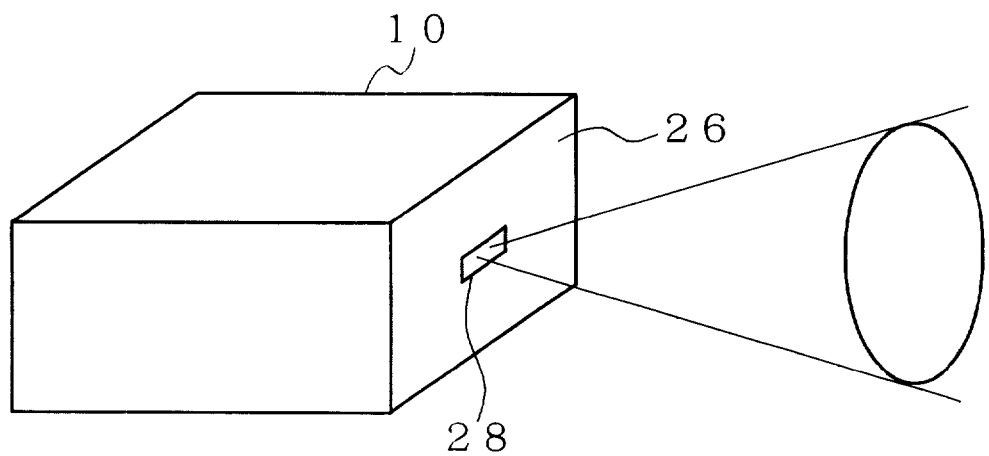
FIG. 8 is a conceptual view illustrating the shape of a laser beam that is outputted directly by a semiconductor laser element.

FIG. 7 is a block diagram showing still another example of the semiconductor laser element machining device embodying the invention. The setups in FIGS. 4 and 5 were shown as ones having the semiconductor laser element 10 oscillated to output a laser beam the optical characteristics of which were measured by the wave front measuring instrument 16 (optical measuring means). An alternative setup, such as one illustrated in FIG. 7, may involve using a known interferometer to acquire optical characteristic data about the end surface 26 of the semiconductor laser element 10, especially about the resonant mirror-finished surface 30.

The wave front measuring instrument 16 also acts as a simple interferometer. A coherent light beam is supplied from a reference light source 12 such as a laser source and sent to the end surface 26 illustratively via a beam splitter 13. The reflected light is measured, and optical data about the shape of the end surface 26 are acquired accordingly. At this point, there is no need for the semiconductor laser element 10 to be in an oscillating state. This scheme may also be applied to machining of a lens, in which case lens shape data may be acquired optically in the same manner described above.

The measurement data thus obtained may be used by the controlling arithmetic device 24 to control the machining laser element 18 and other related components in order to machine the end surface 26. The measuring process is repeated as needed to obtain more data serving as the basis for recurrent machining, as in the case of the preceding embodiments. In addition, as is the case with the embodiments above, the controlling arithmetic device 24 is kept from utilizing the measurement data obtained through measurement of the laser beam outputted from the end surface 26 while it is thermally expanded by the machining laser beam.

As described, the machining device according to the invention produces an optical element (i.e., lens) for adjusting to desired optical characteristics a light beam that is outputted by light output means such as a semiconductor laser element. The device according to the invention allows the lenses of small sizes to be machined and fabricated with ease. Each lens is adjusted to match individual light output means in terms of optical characteristics. This feature significantly enhances the yield percentage of the light output means.

The device according to the invention makes it possible to acquire a semiconductor laser element whose end surface is equipped with a small optical element such as a lens offering desired optical characteristics. Such a lens-mounted semiconductor laser element is easy to fabricate with precision.

The optical element according to the invention may be a nonlinear optical element whose refractive index is variable according to voltage or pressure. As such, the nonlinear optical element is used illustratively by amplitude phase modulators, conjugate mirrors and SHG (second harmonic generators). When a nonlinear optical element is incorporated in the light output means, suitably controlling the voltage or pressure applied to the element permits adjusting the light output means so that its output light will have desired optical characteristics. As is well known, the nonlinear optical element is made from lithium niobate ($LiNbO_3$), lithium titanate ($LiTiO_3$), organic fluorinated polyimide, PMMA (polymethylmethacrylate), etc. Where such a nonlinear optical element is mounted on an end surface of a semiconductor laser element that emits a laser beam through that end surface, it is necessary to form minuscule electrodes on the surroundings of the nonlinear optical element. Such miniature machining may be carried out by use of known techniques. Pressure may be applied to the nonlinear optical element illustratively through the use of a piezoelectric device. Such a piezoelectric arrangement makes it possible to control the nonlinear optical element by pressure.

Furthermore, the inventive device is used to machine an end surface of a semiconductor laser element with high precision so that a laser beam emitted through that end surface will have optical characteristics approximating desired properties. Furnishing the end surface with the desired optical characteristics is particularly effective for a high-power semiconductor laser element.

INDUSTRIAL APPLICABILITY

The invention when embodied as described allows small-sized optical elements to be machined precisely to provide desired optical characteristics. The invention may thus be adapted advantageously to an excitation source for laser media and to beam compensation optics for use with optical pickup devices and laser beam machine tools, among others.

What is claimed is:

1. A semiconductor laser element machining device for machining an end surface of a semiconductor laser element generating and outputting a laser beam, said semiconductor laser element machining device comprising:

optical measuring means for measuring an optical characteristic of said laser beam outputted by said semiconductor laser element;

machining laser beam output means for focusing a machining laser beam on said end surface of said semiconductor laser element;

position adjusting means for adjusting a relative positional relation between said end surface and a position where said machining laser beam is focused; and controlling arithmetic means for controlling said machining laser beam output means and said position adjusting means;

wherein, using measurement data from said optical measuring means, said controlling arithmetic means causes said machining laser beam to machine said end surface so that said laser beam outputted through said end surface will have an optical characteristic approximating a desired characteristic.

2. A semiconductor laser element machining device for machining an end surface of a semiconductor laser element generating and outputting a laser beam, said semiconductor laser element machining device comprising:

optical measuring means for receiving said laser beam and deriving a shape of said end surface of said semiconductor laser element from an optical characteristic of said laser beam;

machining laser beam output means for focusing a machining laser beam on said end surface of said semiconductor laser element;

position adjusting means for adjusting a relative positional relation between said end surface and a position where said machining laser beam is focused; and controlling arithmetic means for controlling said machining laser beam output means and said position adjusting means;

wherein, using measurement data from said optical measuring means, said controlling arithmetic means causes said machining laser beam to machine said end surface so that said laser beam generated by said semiconductor laser element and outputted through said end surface will have an optical characteristic approximating a desired characteristic.

3. A semiconductor laser element machining device according to claim 2, wherein said controlling arithmetic means is prevented from utilizing said measurement data from said optical measuring means when said end surface is thermally affected by absorption of said machining laser beam.

4. A semiconductor laser element machining device according to claim 2, wherein said end surface is machined by said machining laser beam so as to improve single peak status of said laser beam generated by said semiconductor laser element and outputted through said end surface.

5. A semiconductor laser element machining device according to claim 2, wherein said semiconductor laser element includes a pair of resonant mirror-finished surfaces between which said laser beam resonates, said surfaces being opposed to each other, and through one of which said laser beam is outputted, and said machining laser beam is controlled to machine at least one of said pair of resonant mirror-finished surfaces into a curved surface.

6. A semiconductor laser element machining device according to claim 2, wherein said machining laser beam outputted by said machining laser beam output means has a wavelength conducive to being efficiently absorbed by said end surface of said semiconductor laser element.

7. A lens machining device for machining a lens mounted at one end of light output means for outputting light and transmitting said light through said lens, said lens machining device comprising:

optical measuring means for measuring an optical characteristic of said light transmitted through said lens;

machining laser beam output means for focusing a machining laser beam on a surface of said lens;

position adjusting means for adjusting a relative positional relation between the lens surface and a position where said machining laser beam is focused; and controlling arithmetic means for controlling said machining laser beam output means and said position adjusting means;

wherein, using measurement data from said optical measuring means, said controlling arithmetic means causes said machining laser beam to machine said lens so that said light outputted by said light output means and transmitted through said lens will have an optical characteristic approximating a desired characteristic.

8. A lens machining device according to claim 7, wherein said light output means is a semiconductor laser element.

9. A lens machining device according to claim 7, wherein said light output means is a semiconductor laser element and wherein said lens is formed on an end surface of said semiconductor laser element, said end surface outputting a laser beam.

10. A lens machining device according to claim 7, wherein said controlling arithmetic means is prevented from utilizing said measurement data from said optical measuring means when the surface of said lens is thermally affected by absorption of said machining laser beam.

11. A lens machining device according to claim 7, wherein said machining laser beam output means is an ultraviolet laser element.

12. An optical element machining device for machining an optical element provided with light output means for outputting light and transmitting said light through said optical element, said optical element machining device comprising:

optical measuring means for generating measurement data by measuring an optical characteristic of said light transmitted through said optical element;

machining laser beam output means for focusing a machining laser beam on a surface of said optical element;

position adjusting means for adjusting in a relative manner an optical positional relation between said surface of said optical element and a position where said machining laser beam is focused; and controlling arithmetic means for controlling said machining laser beam output means and said position adjusting means;

wherein, using said measurement data from said optical measuring means, said controlling arithmetic means causes said machining laser beam to machine said optical element so that said light outputted by said light output means and transmitted through said optical element will have an optical characteristic approximating a desired characteristic.

13. An optical element machining device according to claim 12, wherein said light output means is a semiconductor laser element.

14. An optical element machining device according to claim 12, wherein said light output means is a semiconductor laser element and wherein said optical element is formed on an end surface of said semiconductor device, said end surface outputting a laser beam.

15. An optical element machining device according to claim 12, wherein said controlling arithmetic means is prevented from utilizing said measurement data from said optical measuring means when the surface of said optical element is thermally affected by absorption of said machining laser beam.

16. An optical element machining device for machining an end surface of an optical element, said optical element machining device comprising:

optical measuring means for generating measurement data by measuring an optical characteristic of light transmitted through and outputted from said end surface of said optical element;

machining laser beam output means for focusing a machining laser beam on said end surface of said optical element;

position adjusting means for adjusting in a relative manner an optical positional relation between said end surface of said optical element and a position where said machining laser beam is focused; and controlling arithmetic means for controlling said machining laser beam output means and said position adjusting means;

wherein, using said measurement data from said optical measuring means, said controlling arithmetic means causes said machining laser beam to machine said end surface of said optical element so that said light transmitted through and outputted from said end surface will have an optical characteristic approximating a desired characteristic.

17. An optical element machining device according to claim 16, wherein said optical measuring means generates said measurement data by optically measuring a shape of said end surface.

18. An optical element machining device according to claim 16, wherein said controlling arithmetic means is prevented from utilizing said measurement data from said optical measuring means when said end surface is thermally affected by absorption of said machining laser beam.

19. An optical element machining device according to claim 18, wherein said optical element is a lens.

20. An optical element machining device according to claim 16, wherein said optical element is a lens and wherein said end surface is a surface of said lens.

21. An optical element machining device according to claim 16, wherein said optical element is a lens made either from glass or from crystal.

22. An optical element machining device according to claim 16, wherein said optical element is a semiconductor laser element and wherein said end surface is an end surface of said semiconductor laser element, said end surface outputting a laser beam.

23. An optical element machining device according to claim 22, wherein said semiconductor laser element includes a pair of resonant mirror-finished surfaces between which said laser beam resonates, said surfaces being opposed to each other, and through one of which said laser beam is outputted, and said machining laser beam is controlled to machine at least one of said pair of resonant mirror-finished surfaces into a curved surface.

24. An optical element machining device according to claim 22, wherein said end surface is machined by said machining laser beam so as to improve single peak status of said laser beam outputted by said semiconductor laser element through said end surface.

25. An optical element machining device according to claim 22, wherein said machining laser beam outputted by said machining laser beam output means has a wavelength conducive to being efficiently absorbed by said end surface of said semiconductor laser element.

26. An optical element machining device according to claim 16, wherein said machining laser beam output means is an ultraviolet laser element.

27. An optical element machining method for machining an end surface of an optical element, said optical element machining method comprising:

a first step of transmitting light through said end surface to produce a measuring light outputted from said optical element;

a second step of generating measurement data by measuring an optical characteristic of said measuring light;

a third step of calculating machining data based on said measurement data to allow said end surface in order to acquire a desired optical characteristic; and a fourth step of machining said end surface by a machining laser beam based on said machining data.

28. An optical element machining method according to claim 27, wherein said second step includes generating said measurement data by optically measuring a shape of said end surface.

29. An optical element machining method according to claim 27, wherein said fourth step includes adjusting relative positional relations between said end surface and a position where said machining laser beam is focused, on the basis of said machining data calculated in said third step.

30. An optical element machining method according to claim 27, wherein said optical element is a semiconductor laser element and wherein said end surface is an end surface of said semiconductor laser element, said end surface outputting light.

31. An optical element machining method according to claim 27, wherein said optical element is a lens and wherein said end surface is a surface of said lens.

32. An optical element machining method according to claim 31, wherein said lens is made either from glass or from crystal.

33. An optical element machining method according to claim 27, wherein said optical element is a nonlinear optical element.

34. An optical element machining method according to claim 27, wherein, when said first through said fourth steps are repeated, said measurement data from said optical measuring means are not used in said third step of calculating said machining data as long as said end surface is thermally affected by absorption of said machining laser beam.

35. An optical element machining method according to claim 27, wherein the machining by use of said machining laser beam is an ablation process using ultraviolet laser.

36. A lens machined by an optical element machining device according to claim 12.

37. A semiconductor laser element having a light-emitting end surface provided with a lens according to claim 36.

38. An semiconductor laser element producing process comprising:

a first step of providing a light-emitting end surface of a semiconductor laser element with an optical element;

a second step of causing said semiconductor laser element to output light through said optical element;

a third step of measuring an optical characteristic of said light transmitted through said optical element;

a fourth step of calculating machining data to allow an end surface of said optical element to be machined in order to acquire a desired optical characteristic, on the basis of measurement data obtained in said third step; and a fifth step of machining said optical element, using said machining laser beam, based on said machining data calculated in said fourth step.

39. A semiconductor laser element producing process according to claim 38, wherein said optical element is machined with said machining laser beam by adjusting in a relative manner an optical positional relation between said end surface and a position where said machining laser beam is focused, on the basis of said machining data.

40. A semiconductor laser element having a light-emitting end surface provided with an optical element, wherein measurement data are obtained by measuring an optical characteristic of light which is outputted from said light-emitting end surface and transmitted through said optical element;

wherein, on the basis of said measurement data, machining data are calculated to machine an end surface of said optical element so as to obtain a desired optical characteristic; and wherein said optical element is machined by use of a machining laser beam based on said machining data.

41. A semiconductor laser element according to claim 40, wherein said optical element is machined with said machining laser beam by adjusting in a relative manner an optical positional relation between said end surface and a position where said machining laser beam is focused, on the basis of said machining data.

42. A semiconductor laser element according to claim 40, wherein said optical element is made either from glass or from crystal.

43. A semiconductor laser element according to claim 40, wherein said optical element is a nonlinear optical element.

44. An optical element for adjusting an optical characteristic of the light outputted by light output means to a desired optical characteristic, wherein measurement data are obtained by measuring an optical characteristic of said light which is outputted by said light output means and transmitted through said optical element;

wherein, on the basis of said measurement data, machining data are calculated to machine said optical element so as to obtain said desired optical characteristic; and wherein an end surface of said optical element is machined by use of a machining laser beam based on said machining data.

45. An optical element according to claim 44, wherein said end surface is machined with said machining laser beam by adjusting in a relative manner an optical positional relation between said end surface and a position where said machining laser beam is focused, on the basis of said machining data.

46. An optical element according to claim 44, wherein said optical element is made either from glass or from crystal.

47. An optical element according to claim 44, wherein said optical element is a nonlinear optical element.

48. A semiconductor laser element machining device according to claim 1, wherein said controlling arithmetic means is prevented from utilizing said measurement data from said optical measuring means when said end surface is thermally affected by absorption of said machining laser beam.

49. A semiconductor laser element machining device according to claim 1, wherein said end surface is machined by said machining laser beam so as to improve single peak status of said laser beam generated by said semiconductor laser element and outputted through said end surface.

50. A semiconductor laser element machining device according to claim 1, wherein said semiconductor laser element includes a pair of resonant mirror-finished surfaces between which said laser beam resonates, said surfaces being opposed to each other, and through one of which said laser beam is outputted, and said machining laser beam is controlled to machine at least one of said pair of resonant mirror-finished surfaces into a curved surface.

51. A semiconductor laser element machining device according to claim 1, wherein said machining laser beam outputted by said machining laser beam output means has a wavelength conducive to being efficiently absorbed by said end surface of said semiconductor laser element.

52. An optical element machining device according to claim 12, wherein said optical element is a lens.

53. An optical element machining device according to claim 12, wherein said machining laser beam output means is an ultraviolet laser element.

* * * * *